US006735006B2

United States Patent

Carberry et al.

(10) Patent No.: US 6,735,006 B2
(45) Date of Patent: May 11, 2004

(54) OPTICAL SWITCH ASSEMBLY

(75) Inventors: John Carberry, Jefferson City, TN (US); Michael L. Smith, Jefferson City, TN (US); Roy Guynn, Blacksburg, VA (US)

(73) Assignee: Neptec Optical Solutions, Inc., Jefferson City, TN (US)

( * ) Notice: Subject to any disclaimer, the term of this patent is extended or adjusted under 35 U.S.C. 154(b) by 67 days.

(21) Appl. No.: 10/217,178

(22) Filed: Aug. 12, 2002

(65) Prior Publication Data

US 2004/0027640 A1 Feb. 12, 2004

(51) Int. Cl.[7] ............................ G02B 26/08; G02B 6/26

(52) U.S. Cl. ....................... 359/212; 359/213; 359/223; 385/16; 385/17; 385/18; 385/33

(58) Field of Search ............................... 385/15–18, 33, 385/34; 359/212, 213, 214, 223, 226, 204, 291

(56) References Cited

U.S. PATENT DOCUMENTS

| | | | |
|---|---|---|---|
| 5,175,780 A | 12/1992 | Sano et al. | |
| 5,542,013 A | 7/1996 | Kaplow et al. | |
| 5,546,180 A | 8/1996 | Garel-Jones et al. | |
| 6,094,293 A * | 7/2000 | Yokoyama et al. | 359/280 |
| 6,404,942 B1 * | 6/2002 | Edwards et al. | 385/18 |

* cited by examiner

*Primary Examiner*—Hung Xuan Dang
*Assistant Examiner*—Tuyen Tra
(74) *Attorney, Agent, or Firm*—Pitts & Brittian, P.C.

(57) ABSTRACT

An apparatus for switching a single optical signal to any one of several outputs. An input collimator transmits an optical signal that is reflected from two mirrors on an optical bench into an output collimator. Between the two mirrors is an actuator that interrupts the optical signal and effects another signal from an end collimator into one mirror and the output collimator. The alignment of the collimators and actuators relative to the optical bench is achieved by actively aligning the elements, which includes monitoring an optical signal passing through the collimator and using the signal as feedback for positioning control.

24 Claims, 6 Drawing Sheets

OPTICAL SWITCH ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to optical switches. More particularly, this invention pertains to an array of optical switches with a spare input available to replace any of the optical inputs in the array. This invention also includes a method of actively aligning such an array.

2. Description of the Related Art

Optical signals are transmitted over fiber optic cables. There is a large demand to send optical signals over great distances without sacrificing data integrity. In order to achieve this goal, it is common practice to use repeaters at intermediate distances. Repeaters typically convert the optical signal into an electrical signal and then back into another optical signal, which is sent over the next length of fiber optic cable.

It is desirable to maximize the up-time of fiber optic systems. One common method to achieve maximum up-time is to have spare optical transmitters standing by that can be switched to replace failed transmitters. Typically, there is one spare for each transmitter, which results in a large amount of unused, standby capacity.

Fiber optic cables have a minimum bend radius which is large relative to the cable diameter. Accordingly, routing of fiber optic cables oftentimes determines the size and layout of fiber optic equipment, which is commonly rack mounted with input and output connections accessible from a front panel. In order to accommodate high density requirements, it is desirable to minimize the size of fiber optic equipment.

It is also desirable to minimize attenuation of the optical signals in optical equipment. A factor that affects attenuation is the dimensional stability of the components in the optical equipment. The optical signal from an fiber optic cable has a small size and small changes in alignment, for example, due to changes in temperature, may cause attenuation of the optical signal. Further, it is desirable to operate optical equipment over a wide temperature range, which is at odds with the desire to minimize attenuation.

BRIEF SUMMARY OF THE INVENTION

According to one embodiment of the present invention, an optical switch assembly and method of assembly are provided. The switch assembly has a plurality of optical inputs providing optical signals to a plurality of optical outputs. The switch assembly includes actuators that can switch the optical signal from an optical transmitter to any one of the plurality of optical outputs.

The optical switch assembly includes an optical bench with input and output collimators fixed such that the optical signal is reflected from mirrors from each input collimator to its associated output collimator. In each optical path is an actuator that can redirect an optical signal from a collimator located at one end of the optical bench to the output collimator, thereby replacing a failed input signal with one from a single, spare laser. In another embodiment, the input and output collimators are reversed such that any one input can be switched to a single output collimator.

The optical bench is made of a material that has a coefficient of thermal expansion similar to that of the mirrors and adhesive fixing the collimators in place. In another embodiment, the adhesive is a fast setting compound that permits the collimators and actuators to be precisely positioned and fixed in place.

The method of actively aligning the collimators and actuators includes attaching the mirrors to the optical bench, positioning a first collimator, securing it with adhesive, and aligning the collimator. After the first collimator is aligned and fixed in place, the end collimator is similarly positioned, secured, and aligned. After the first collimator is aligned, the second collimator opposite the first is aligned by sending an optical signal from the first to the second collimator. After the first and second collimators are aligned, the actuator is positioned, secured, and the actuator mirror is aligned by sending an optical signal from the first to the end collimator. The above procedure is repeated for each pair of collimators.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
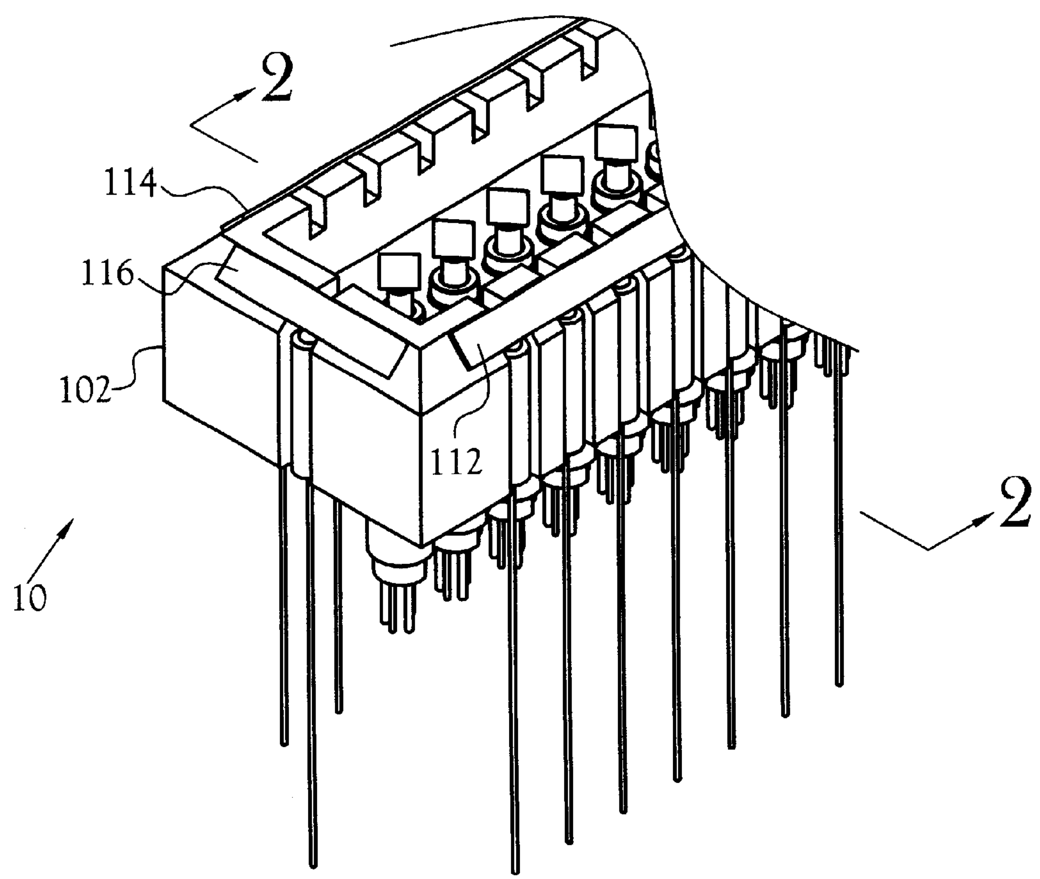
FIG. 1 is a partial perspective view of an optical bench showing the optical collimators and switches.

An apparatus for switching a single optical signal to any one of several optical outputs is disclosed. FIG. 1 illustrates the optical switch assembly, generally referred to as number 10 in the figures. The switch assembly, or array, 10 includes an optical bench 102 with mirrors 112, 114, and 116 attached.

Figure 2:
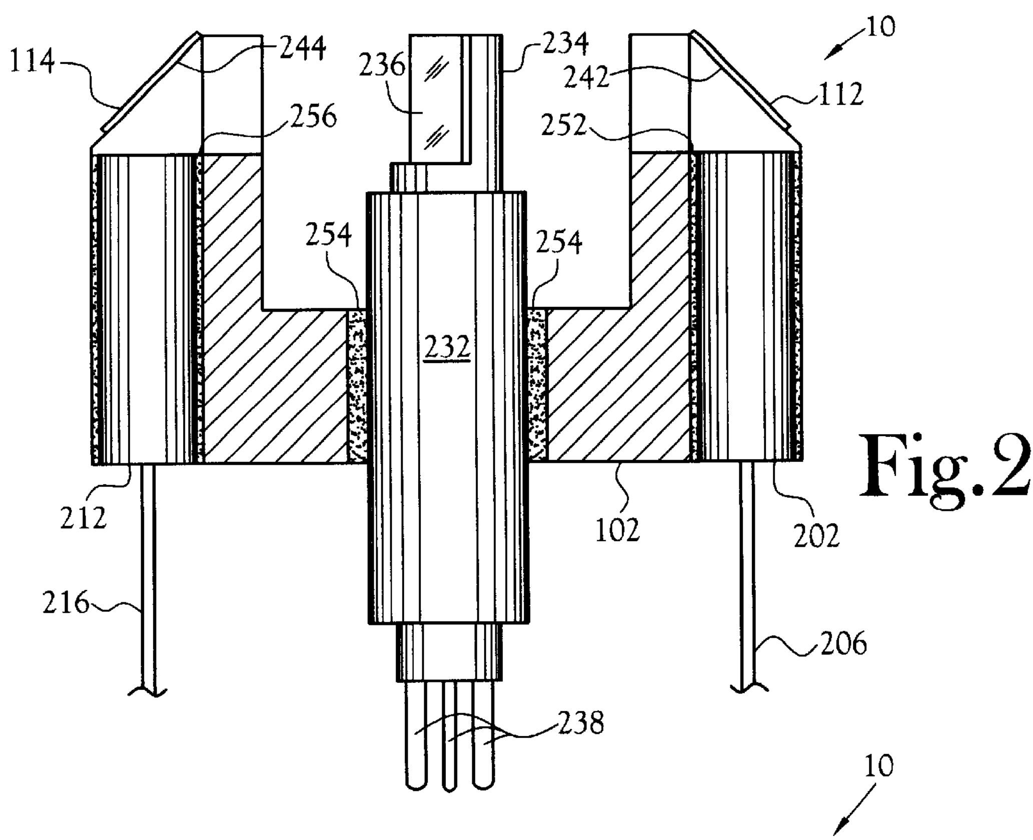
FIG. 2 is a cutaway view of the bench showing the relationship of two collimators and the optical switch.

FIG. 2 illustrates a cutaway view showing the arrangement of an input collimator 202, an actuator 232, and an output collimator 212. The actuator 232 is illustrated in the actuated position with the shuttle 234 and the switch mirror 236 positioned to redirect the optical signal to collimator 212 and mirror 114. The actuator 232 is an optical switch with two positions, one position that redirects an optical signal and another that does not redirect the signal. In the illustrated embodiment, the actuator 232 has three power leads 238 for extending and retracting the shuttle 234 and mirror 236. Also, the illustrated shuttle 234 is a cylinder with an upper portion cut away with the mirror 236 attached to the face of the remaining portion of the cylinder 234. In another embodiment, the mirror 236 is attached to the shuttle 234 having a cone-shaped upper portion.

It is apparent in FIG. 2 that the fiber optic cables 206, 216 connected to the collimators 202, 212 are parallel and adjacent. The arrangement of the fiber optic cables 206, 216 illustrated in FIGS. 1 and 2 permits the cables 206, 216 to be routed similarly to an interface panel containing optical input and output connections.

In one embodiment, the switch assembly 10 has twenty input collimators 202 and twenty output collimators 212, with one end collimator 312 providing a replacement input that can be switched to any of the twenty output collimators 212. This configuration is a 20-by-21 switch. In another embodiment, the switch assembly 10 has twenty input collimators 202 and twenty output collimators 212, with one end collimator 312 serving as an output for any one of the twenty input collimators 202. Those skilled in the art will recognize that the number of input and output collimators 202, 212 can vary without departing from the scope or spirit of the present invention.

Figure 3:
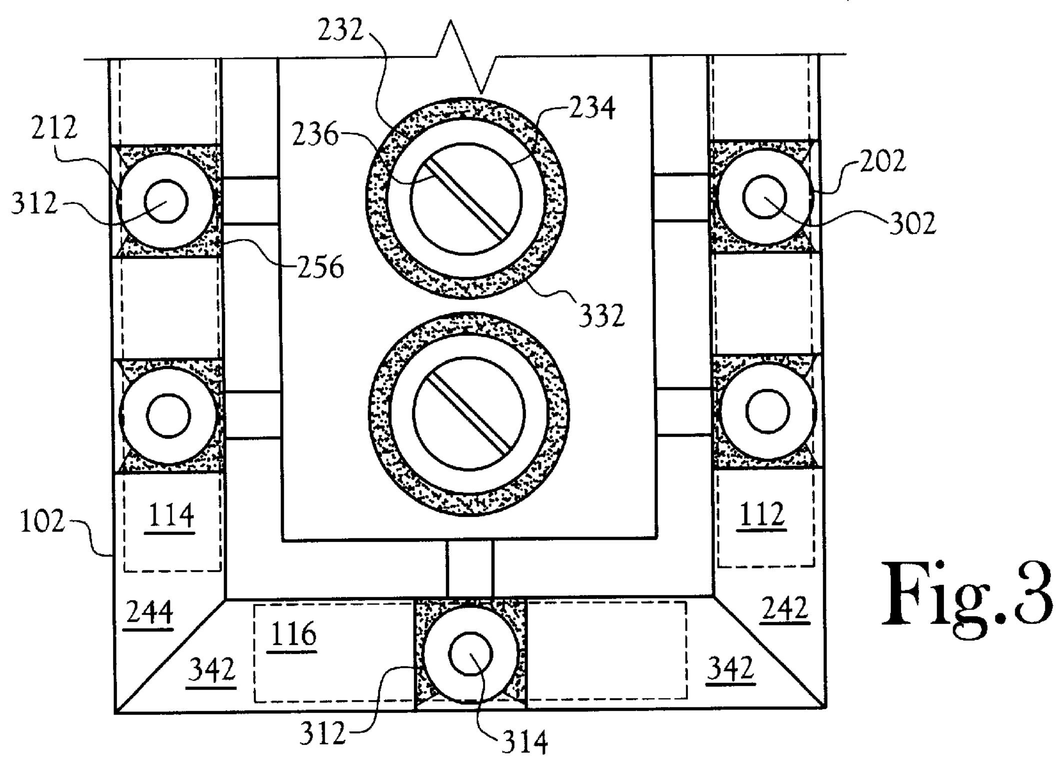
FIG. 3 is a top view of a collimator and two pairs of collimators with their associated switches.

FIG. 3 illustrates a top view of one end of the switch assembly 10. The mirrors 112, 114, and 116 are illustrated in phantom so as to show the collimators 202, 212, 312. The input collimators 202 are a means for accepting optical input signals. The output collimators 212 are a means for transmitting optical output signals. The end collimator 312 is a means for accepting a replacement optical input signal. A means for directing the optical input signals from the collimators 202, 312 to the output collimators 212 include the mirrors 112, 114, 116. The actuators 232 are a means for selectively replacing any one of the optical inputs from the input collimators 202 with the replacement optical input.

The collimators 202, 212, 312 and the switches 232 are secured to the bench 102 by an adhesive 252, 254, 256. The adhesive 252, 256 fills a gap between the collimators 202, 212, 312 and the optical bench 102. The adhesive 254 fills a gap between the actuators 232 and the optical bench 102. The gaps filled by the adhesive 252, 254, 256 permit the collimators 202, 212, 312 and the actuators 232 to be moved relative to the bench 102 during positioning and alignment before the adhesive 252, 254, 256 is cured.

In one embodiment the adhesive 252, 254, 256 is a quick curing adhesive blended with amorphous silica spheres of a selected diameter. The adhesive is compressed between the mirrors 112, 114, and 116 and the optical bench 102, with the spheres forming a monolayer, which results in dimensional stability when the adhesive is cured. In another embodiment the adhesive 252, 254, 256 is Dymax OP66LS, which has a coefficient of thermal expansion similar to that of the bench 102 such that the collimators 202, 212, 312 remain in alignment as the temperature varies within the operating range of the switch assembly 10.

The precise alignment of the collimators 202, 212, 312 to the mirrors 112, 114, 116, 236 is critical in fiber optics. Any misalignment can result in an attenuation of the signal or the loss of the signal. By matching the coefficient of thermal expansion of the individual components and adhesives, the components of the switch assembly 10 remain in alignment over a wide temperature range such that the optical path does not suffer degradation as the temperature varies. In one embodiment, the temperature range is from −40° to +85° Centigrade. In another embodiment, the transition point of the adhesive 252, 254, 256 is outside the operating temperature range, which enhances the dimensional stability of the switch assembly 10. In one embodiment, keeping the transition point outside the operating range is accomplished by using fillers. In still another embodiment, the adhesive 252, 254, 256 has limited shrinkage, which can be accomplished with a filler. Further, the adhesive 252, 254, 256 can be cured in place, which aids in the active alignment of the collimators 202, 212, 312 and actuators 232. In one embodiment the adhesive 252, 254, 256 is cured by ultraviolet light.

The optical bench 102 is in the general shape of a channel with one end closed. That is, the bench 102 has a base with three perpendicular side walls. Spaced along the sides of the bench 102 walls are slots into which the collimators 102, 112, 312 fit with clearance for an adhesive 252, 256. Spaced along the top of the bench 102 walls are slots through which the optical paths travel between the collimators 102, 112, 312 and actuators 232. Those skilled in the art will recognize that the slots can be rectangular as illustrated or of any other shape, such as a V-shaped groove or even a drilled opening, without departing from the spirit and scope of the present invention. The illustrated configuration of the optical bench 102 provides for a short free space distance for the optical signal to travel, which, for fiber optics, minimizes the signal degradation.

The optical bench 102 has chamfers 242, 244, 342 between its side walls and top surfaces. In one embodiment, each chamfer 242, 244, 342 is at a precise 45° angle. Mirrors 112, 114, 116 are reflectors attached to surfaces 242, 244, 342 with a reflective surface positioned to reflect the optical signal from or to the collimator. In one embodiment, the mirrors 112, 114, 116 are front-sided mirrors having a reflective surface on the surface of the mirrors 112, 114, 116 facing the optical bench 102 surfaces 242, 244, 342. The mirrors 112, 114, 116 in one embodiment are glass with a reflective surface. In another embodiment, the mirrors 112, 114, 116 are metal, such as Kovar, with a reflective surface. In one embodiment an adhesive (not illustrated) is used to affix the mirrors 112, 114, 116 to the optical bench 102.

In one embodiment the bench 102 is made of Kovar metal, which has a coefficient of thermal expansion similar to that of glass. The mirrors 112, 114, 116 are fixed to the bench 102 with an adhesive. In one embodiment the adhesive has a coefficient of thermal expansion similar to that of the mirrors 112, 114, 116 and the bench 102. Likewise, the actuators 232 and collimators 102, 112, 312 are fabricated of materials with a coefficient of thermal expansion similar to that of the bench 102. In one embodiment the mirrors 112, 114, 116 are glass plates with a front side reflective coating responsive to the frequencies passed by the collimators 102, 112, 312. In another embodiment, the mirrors are flat plates with a front side reflective coating, and the plates have a coefficient of thermal expansion similar to that of the optical bench 102.

Figure 4:
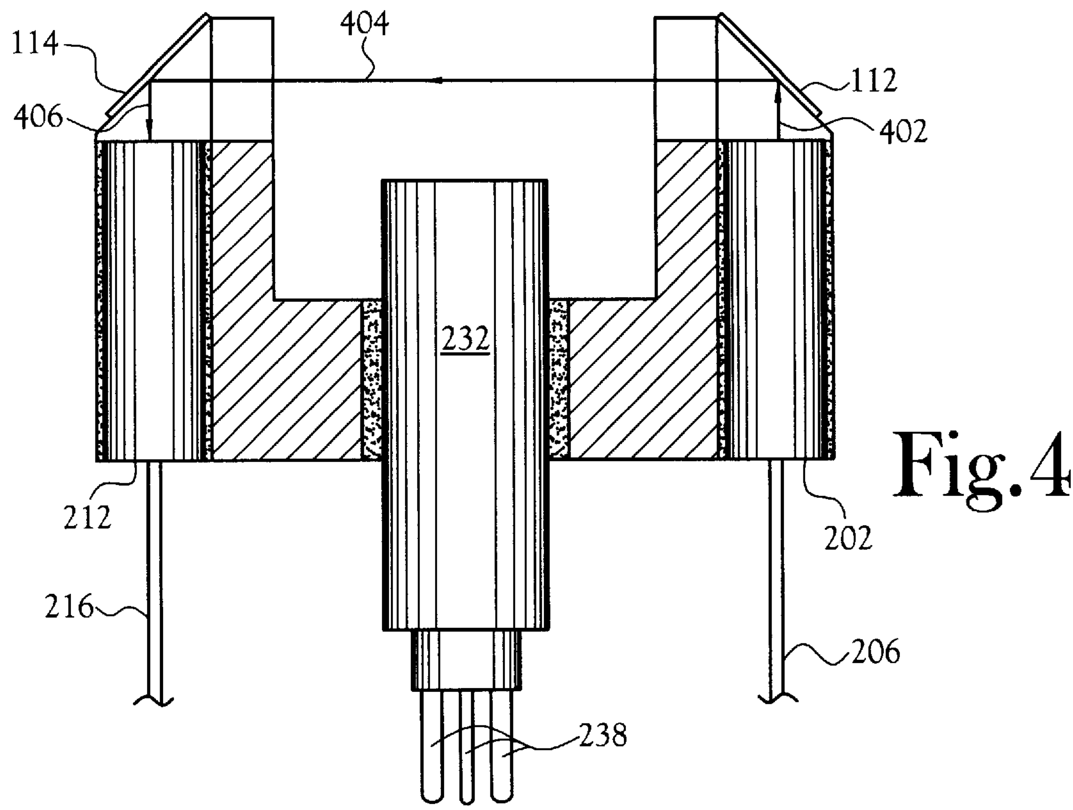
FIG. 4 is a cutaway view showing a normal optical path.

FIG. 4 illustrates the normal optical path 402, 404, 406 from the input collimator 202 and its associated fiber optic cable 206, reflected from the input mirror 112 downbeam to the output mirror 114 and into the output collimator 212 and its associated fiber optic cable 216. With this normal optical path 402, 404, 406, the actuator 232 has the shuttle 234 and mirror 236 retracted such that the optical path 404 is not interrupted.

Figure 5:
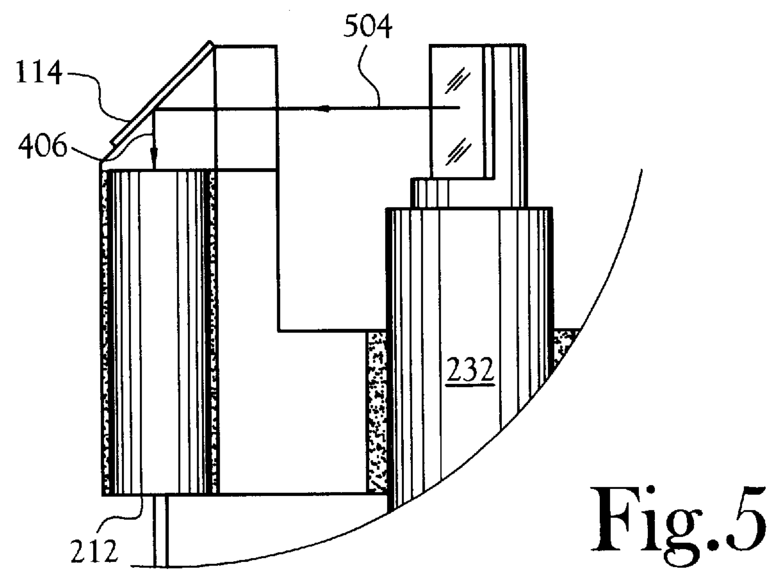
FIG. 5 is a partial cutaway view showing an optical path from the switch to an output collimator.

FIG. 5 illustrates a partial view of a switched optical path 504, 406 reflected by mirror 114, and into the output collimator 212 and its associated fiber optic cable 216. The actuator 232 has the shuttle 234 and mirror 236 extended such that the optical path 504 is reflected by mirror 236.

Figure 6:
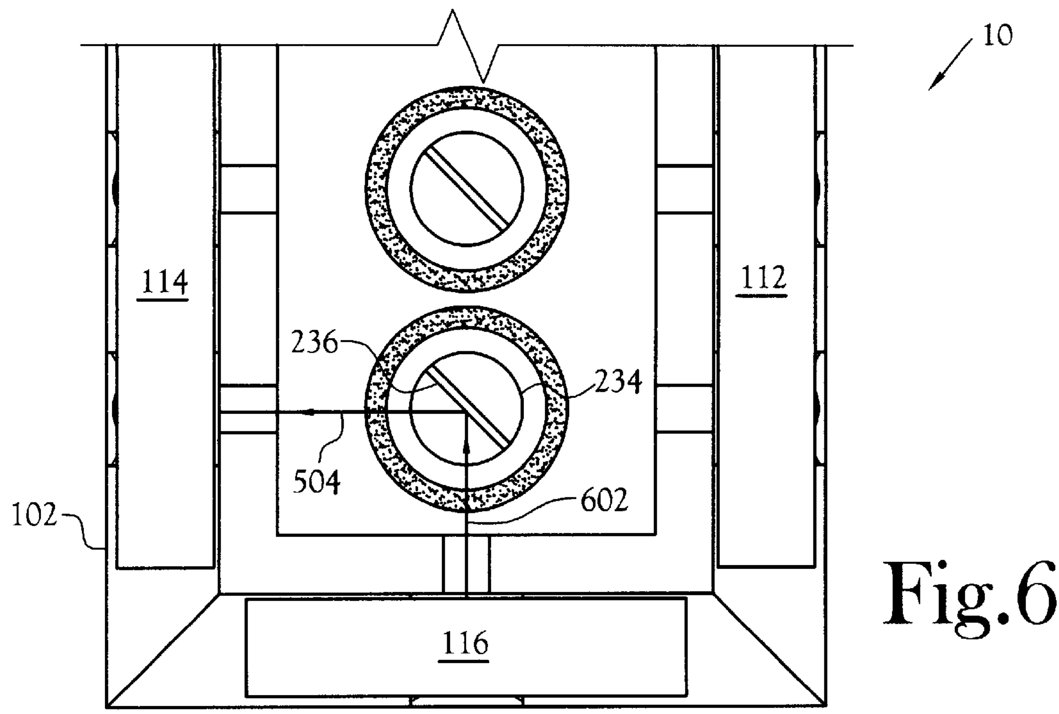
FIG. 6 is a top view showing an optical path from the tunable laser collimator to the output collimator.

FIG. 6 is a top view illustrating the switched optical path 602, 504 from the end collimator 312. The end collimator 312 includes a fiber optic cable through which the optical path from a tunable laser originates. The optical path from the end collimator 312 follows a route similar to that from the input collimator 202 and is reflected from the mirror 116. The optical path 602 from the mirror 116 is reflected from the mirror 236 on actuator 232 and to the output mirror 112 downbeam the actuator mirror 236. In another embodiment, the optical path 602, 504, 406 travels in a reverse direction such that the collimator 212 is an input collimator and the end collimator 312 is an output collimator. In this embodiment, any one of the input collimators 212 can be switched to the end, output collimator 312.

Figure 7:
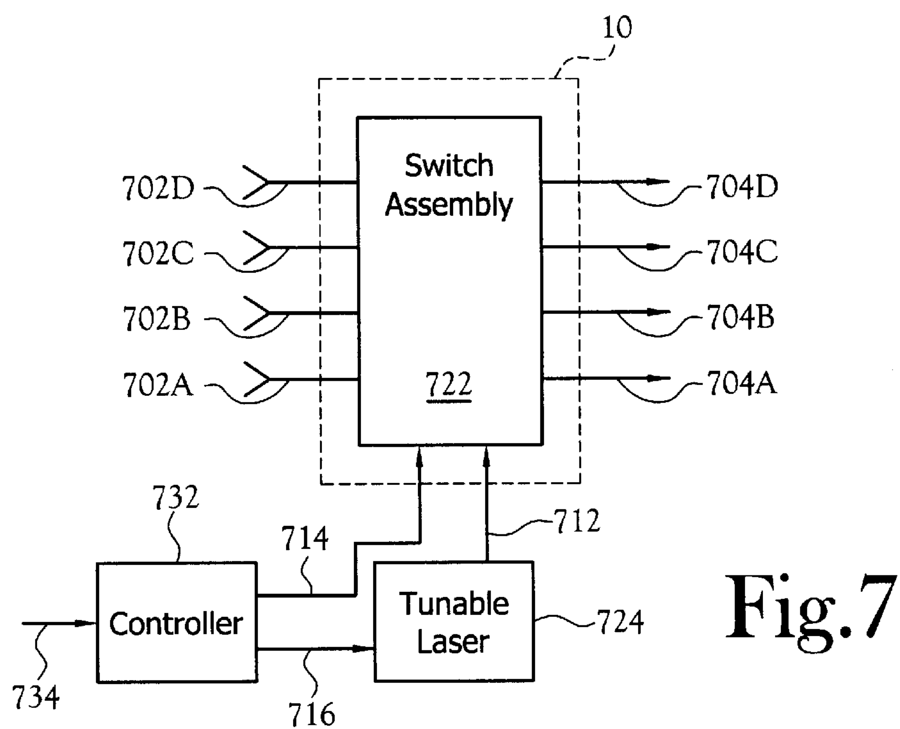
FIG. 7 is a block diagram of the switch assembly, tunable laser, and controller.

FIG. 7 illustrates a block diagram of a system including the switch assembly 10. A plurality of optical inputs 702A to 702D pass through the switch assembly, or array, 10 to a plurality of optical outputs 704A to 704D. Although a 4-by-5 switch assembly is illustrated, one skilled in the art will recognize that the number of inputs and outputs can vary without departing from the scope and spirit of the present invention. The illustrated embodiment shows a tunable laser 724 providing an optical input 712 to the end collimator. In another embodiment, the laser is a fixed-wavelength laser and is useful when all the switch assembly 10 inputs 702 operate at the same wavelength. The laser 724 can be either directly or externally modulated. In one embodiment, the tunable laser 724 is a hot spare that can be set to the desired color or wavelength of the input signal 702 to be replaced. A tunable laser 724 that can be tuned quickly, for example, in less than 20 nanoseconds, allows the laser 724 to spare the failed input 702 with minimal impact on the output signal 704. In one embodiment, the tunable laser has an output between 1200 and 1700 nanometers. In another embodiment, the laser 724 is tunable between 1529 to 1561 nanometers (the C-band). Those skilled in the art will recognize that the tunable spectrum of the laser 724 can vary to fit a particular application without departing from the scope and spirit of the present invention.

A controller 732 provides control signals 714, 716 to the switch assembly 10 and to the tunable laser 724. The control signals 714 to the switch assembly 10 cause the appropriate actuator 232 to operate and divert the optical signal 712 from the tunable laser 724 to the corresponding output 704A to 704D. In one embodiment, the controller input 734 is monitoring the switch assembly 10 inputs 702A to 702D, and when a failed input is sensed, the controller 732 causes the appropriate actuator 232 to divert the optical signal 712 from the tunable laser 724 to the appropriate output 704A to 704D. At the same time, the controller 732 modulates the tunable laser 724 with the appropriate signal for the failed 702A to 702D.

Figure 8:
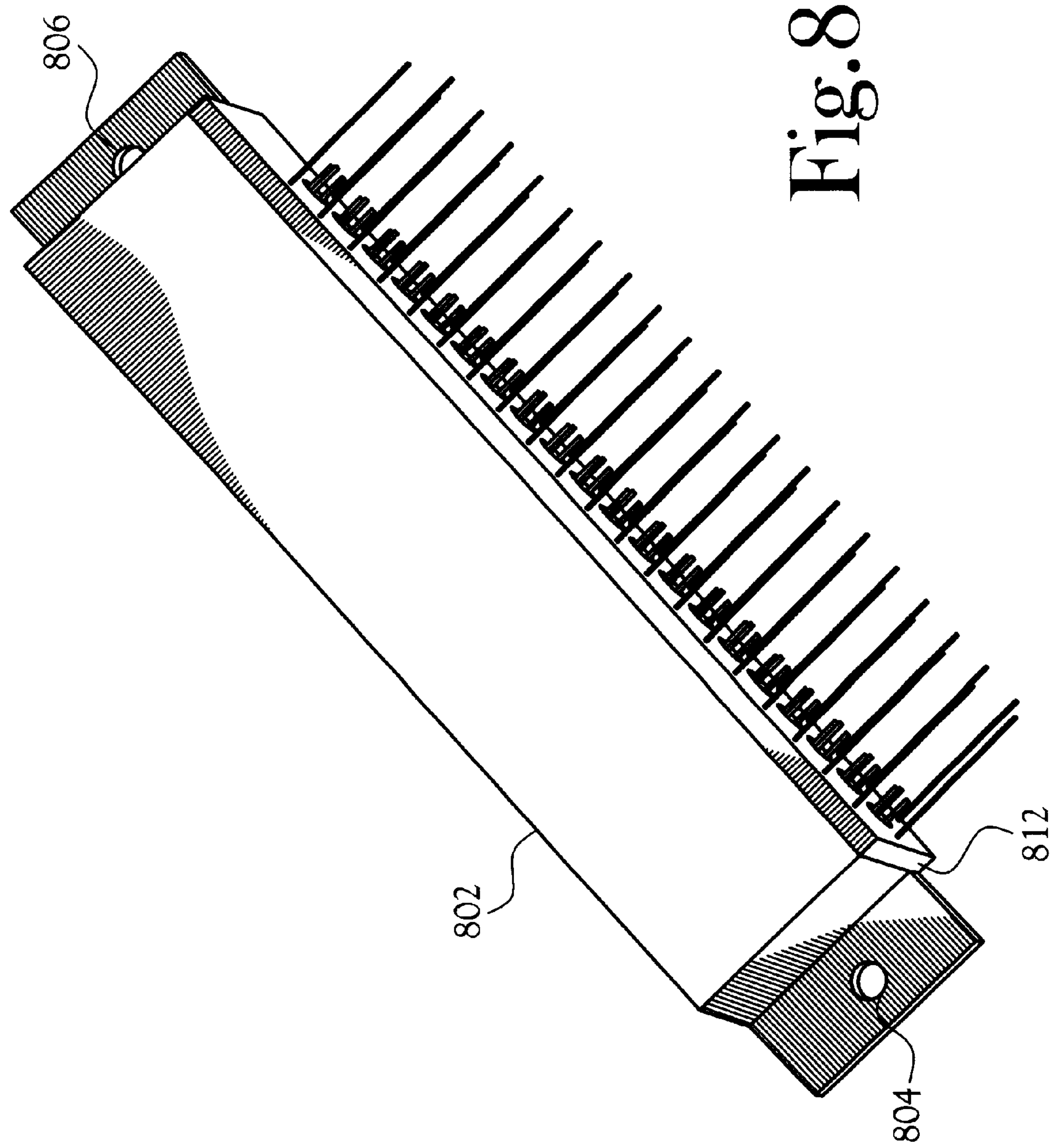
FIG. 8 is a perspective view of the switch assembly mounted inside a housing.

FIG. 8 illustrates an embodiment of the switch assembly 10 mounting in a housing 802 suitable for attaching to a printed circuit board. A base plate 812 supports the switch assembly 10 and has provisions for the fiber optic cables 206, 216 and electrical connections 238 to exit the base plate 812. The base plate 812 is attached to the housing 802, which has mounting holes 804, 806 for attaching the housing 802 to a printed circuit board.

In the illustrated embodiment, the electrical connections 238 for the actuators 232 protrude from the base plate 812 and the control wiring is soldered to the appropriate electrical connections 238. In another embodiment, a connector plugs into the protruding electrical connections 238. In still another embodiment, the electrical connections 238 are rigid wires formed such that the wires mate with through-openings in the printed circuit board, thereby facilitating electrical contact with the switch actuators 232.

Figure 9:
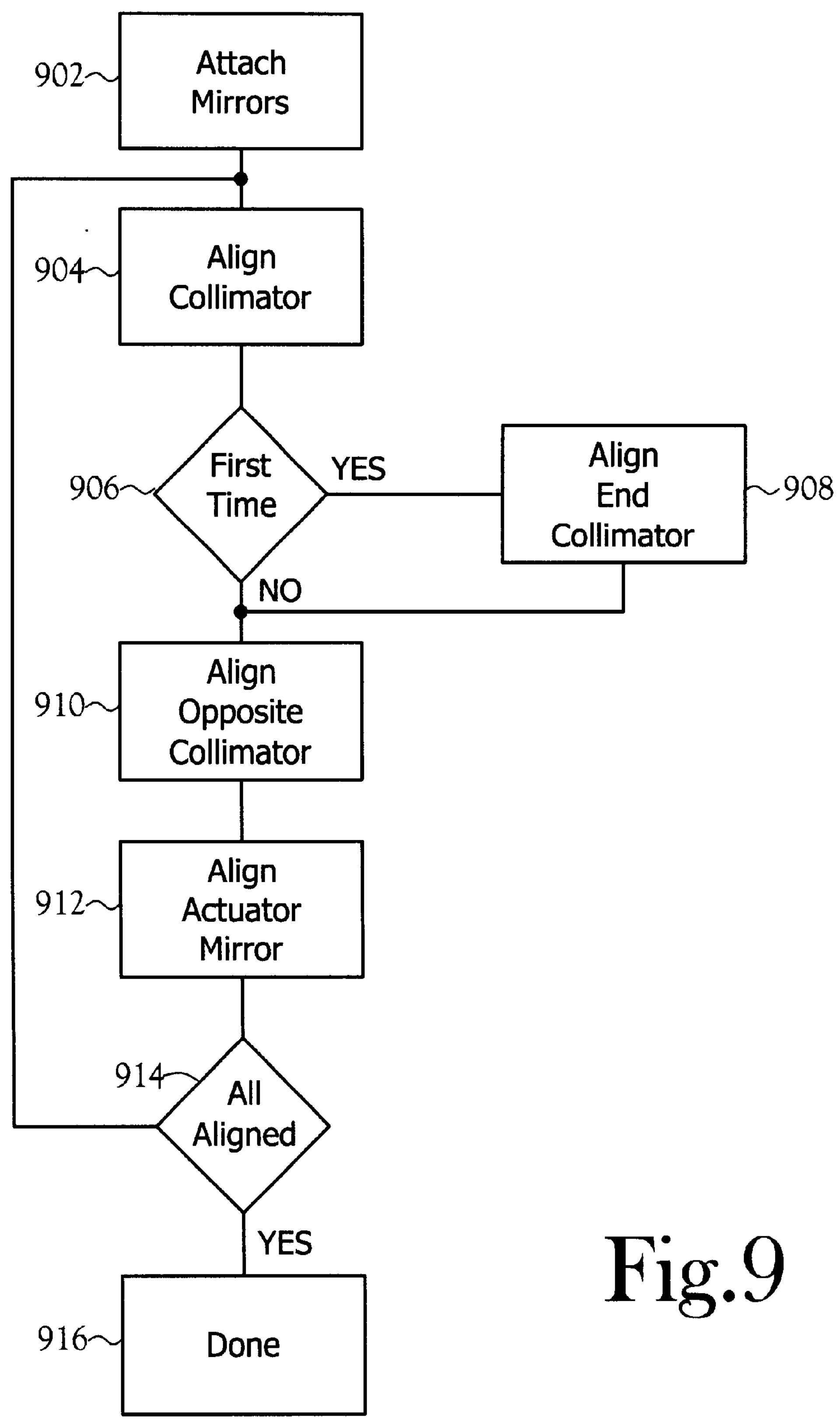
FIG. 9 is a flow chart of the steps for assembling an optical switch assembly.

FIG. 9 illustrates a flow chart detailing the major steps of assembling and active aligning the switch assembly 10. Before the first step in the figure can be performed, the optical bench 102 must be machined or fabricated. In one embodiment, the optical bench 102 has chamfers 242, 244, 342 precision cut at 45 degrees. Those skilled in the art will recognize that the angle of the chamfers can vary so long as the collimators 202, 212, 312 remain in alignment, that is, the input optical path is received by the output collimator. The bench 102 has slots machined on its sides for the collimators and has slots machined for the optical path to follow after being reflected from the mirrors 112, 114, 116.

The first step 902 after the optical bench 102 is machined is to attach the 45° mirrors 112, 114, 116 to the bench chamfers 242, 244, 342. The second step 904 is to align a first collimator, for example 202. This second step 904 includes temporarily positioning a 90° reflecting mirror in the bench 102 such that an optical signal passed through the collimator 202 is reflected back into the collimator 202 when it is aligned properly. The collimator 202 is positioned in a slot in the side of the bench 102, along with an amount of uncured adhesive 252 sufficient to secure the collimator 202 in position after curing. The collimator 202 is then positioned such that an optical signal fed into the collimator 202 is reflected off the 45° mirror attached in the first step 902 and reflected again by the temporary 90° mirror, which sends the optical signal back to the 45° mirror and into the collimator 202. In one embodiment, a high-precision robot actively aligns the collimator 202 by using the intensity of the reflected optical signal as feedback and moving the collimator 202 to maximize the signal. After the collimator 202 is positioned in alignment, the adhesive 252 is cured. In one embodiment, the adhesive 252 is cured with ultraviolet light. In another embodiment, the adhesive 252 has low shrinkage and its coefficient of thermal expansion is similar to that of the bench 102.

The next step 906 is a decision point. If collimator 202 is the first collimator aligned, the end collimator 312 is next aligned 908. The step of aligning 908 the end collimator 312 involves similar sub-steps as for the step of aligning 904 the first collimator 202. A temporary mirror is installed at a 45° angle relative to the optical path from the first collimator 202. The end collimator 312, along with its adhesive, is actively aligned in its end slot by sending an optical signal from either the collimator 202 or the end collimator 312 and measuring the optical signal at the other collimator. The active alignment optical path is similar to that illustrated in FIGS. 5 and 6. In one embodiment, the first collimator 202 is installed at the end furthest from the end collimator 312, thereby ensuring that any errors in alignment of the end collimator will be reduced relative to all the other collimators. In another embodiment, the end collimator 312 is aligned 908 after the second collimator is aligned 910.

After the first collimator 202 is aligned 904, its opposite collimator 212 is aligned 910. This alignment 910 includes actively aligning the opposite collimator 212 after the collimator 212 and its uncured adhesive 252 are positioned in the optical bench 102. An optical signal is fed into either of the two collimators 202 or 212 and the signal is measured at the other collimator 202 or 212 after being reflected from the two mirrors 112, 114. After the proper alignment is located, the adhesive 252 is cured.

The next step 912 is to align the actuator 232 and its mirror 236. The actuator 232 and its adhesive 254 is inserted into an opening 332 in the optical bench 102. The actuator 232 is actuated such that its mirror 236 is extended into the optical path between the collimators 202, 212. The actuator 232 is actively aligned by sending an optical signal from either the first collimator 202 or the end collimator 312, and measuring the optical signal at the other collimator 202 or 312. After alignment of the actuator mirror 236 is achieved, the adhesive 254 is cured.

The previous steps of aligning the first collimator 904, the opposite collimator 910, and the actuator mirror 912 are repeated 914 for the remaining collimators. After all the collimators and actuators are aligned, the active alignment is done 916.

From the foregoing description, it will be recognized by those skilled in the art that an optical switch assembly has been provided. The switch assembly, in one embodiment, can switch a spare input to any one output, and in another embodiment, can switch any input to a separate output. Additionally, a method of actively aligning such an assembly has been described.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. An apparatus for switching a single optical signal between any one of several collimators and a single collimator, said apparatus comprising:

an optical bench having a base, a first side wall, a second side wall, and an end wall, said optical bench having a first chamfer adjacent said first side wall, a second chamfer adjacent said second side wall, and an end chamfer adjacent with said end wall;

a first mirror fixed to said first chamfer;

a second mirror fixed to said second chamfer;

an end mirror fixed to said end chamfer;

at least one first collimator, each of said at least one first collimator positioned in a slot in said first side wall;

at least one second collimator, each of said at least one second collimator positioned in a slot in said second side wall, each of said at least one first collimator positioned relative to a corresponding one of said at least one second collimator such that a first optical signal emitted from said at least one first collimator is reflected by said first mirror and said second mirror into said corresponding one of said at least one second collimator;

an end collimator positioned in a slot in said end wall; and at least one actuator, each one of said at least one actuator having an actuator mirror selectively movable between a first position and a second position, whereby said actuator mirror in said first position interrupts said first optical signal and reflects a second optical signal from said end collimator and said end mirror to said second mirror and said second collimator, whereby said actuator mirror in said second position not interrupting said first optical signal.

2. The apparatus of claim 1 wherein said at least one first collimator, said at least one second collimator, and said end collimator are fixed to said optical bench with an adhesive.

3. The apparatus of claim 2 wherein said adhesive has a coefficient of thermal expansion similar to that of said optical bench such that said collimators remain in alignment within an operating temperature range of said apparatus.

4. The apparatus of claim 1 wherein said optical bench, said collimators, said mirrors, and said at least one actuator have a substantially common coefficient of thermal expansion.

5. The apparatus of claim 1 wherein said optical bench, said collimators, said mirrors, and said at least one actuator maintain an alignment relative to each other such that said first optical signal and said second optical signal, as received by said at least one second collimator, remain at full strength over a preselected operating temperature range.

6. The apparatus of claim 1 wherein said input mirror is affixed to said first chamfer with an adhesive.

7. The apparatus of claim 6 wherein said adhesive is a quick curing adhesive blended with a plurality of amorphous silica spheres of at least one selected diameter.

8. The apparatus of claim 1 wherein said at least one first collimator, said at least one second collimator, said end collimator, said first mirror, said second mirror, and said end mirror are fixed to said optical bench with an adhesive.

9. The apparatus of claim 8 wherein said adhesive is a quick curing adhesive blended with a plurality of amorphous silica spheres of at least one selected diameter.

10. The apparatus of claim 8 wherein said adhesive has a transition point outside a preselected operating temperature range of said apparatus.

11. The apparatus of claim 8 wherein said preselected operating temperature range of said apparatus has a lower limit of −40 degrees Centigrade.

12. The apparatus of claim 8 wherein said preselected operating temperature range of said apparatus has an upper limit of +85 degrees Centigrade.

13. The apparatus of claim 1 wherein said optical bench is mounted inside a housing, and said housing is adapted for printed circuit board mounting.

14. The apparatus of claim 1 further including a laser having its optical output in communication with said end collimator.

15. The apparatus of claim 1 wherein said end collimator has an optical input in optical communication with a tunable laser.

16. An apparatus for switching a single optical signal between any one of several collimators and a single collimator, said apparatus comprising:

at least one first collimator;

at least one first reflector held in spatial relationship with said at least one first collimator;

at least one second reflector held in spatial relationship with said at least one first reflector;

at least one second collimator held in spatial relationship with a corresponding one of said at least one second reflector, whereby a first optical signal from said at least one first collimator is reflected by a corresponding one of said at least one first reflector and a corresponding one of said at least one second reflector into a corresponding one of said at least one second collimator;

an end collimator held in spatial relationship with said at least one first collimator;

an end reflector held in spatial relationship with said end collimator;

at least one actuator, each having a reflector selectively movable between a first position and a second position, said at least one actuator held in spatial relationship with said at least one second collimator, whereby said reflector in said first position reflects a second optical signal from said end collimator and said end reflector to said second reflector and said second collimator, whereby said reflector in said second position not interrupting said first optical signal.

17. The apparatus of claim 16 wherein said collimators, said reflectors, and said at least one actuator maintain an alignment relative to each other such that said first optical signal and said second optical signal, as received by said at least one second collimator, remain substantially undiminished over a preselected operating temperature range.

18. The apparatus of claim 16 further including a tunable laser having its optical output in communication with said end collimator.

19. The apparatus of claim 16 wherein said end collimator has an optical input in optical communication with a tunable laser.

20. An apparatus for switching one optical signal to any one of several outputs, said apparatus comprising:

a means for accepting a plurality of optical inputs;

a means for transmitting a plurality of optical outputs;

a means for directing a plurality of optical signals from said plurality of optical inputs to said plurality of optical outputs;

a means for accepting a replacement optical input; and a means for selectively replacing any one of said plurality of optical inputs with said replacement optical input.

21. A method for actively aligning a switch assembly, said method comprising the steps of:

a) fabrication of an optical bench having a base, a first side wall, a second side wall, and an end wall, said optical bench having a first chamfer adjacent said first side wall, a second chamfer adjacent said second side wall, and an end chamfer adjacent with said end wall;

b) attaching an input mirror to said first chamfer, an output mirror to said second chamfer, and an end mirror to said end chamfer;

c) aligning a first collimator of at least one pair of collimators;

d) aligning an end collimator;

e) after said step of aligning said first collimator, aligning a second collimator of said at least one pair of collimators, said second collimator opposite said first collimator;

f) after said step of aligning said first collimator and said step of aligning said end collimator, aligning an actuator mirror;

g) repeating aligning steps c), e) and f) for each of said at least one pair of collimators.

22. The method of claim 21 wherein said step c) aligning said first collimator includes c1) inserting said first collimator and an uncured adhesive into a slot in said optical bench;

c2) placing a temporary 90 degree mirror in said optical bench;

c3) passing an optical signal through said first collimator such that said optical signal reflects first off said input mirror, second off said temporary mirror, and then off said input mirror into said first collimator;

c4) monitoring said optical signal reflected into said first collimator;

c5) positioning said first collimator to maximize said reflected optical signal;

c6) curing said adhesive; and c7) removing said temporary mirror.

23. The method of claim 21 wherein said step e) aligning said second collimator includes e1) inserting said second collimator and an uncured adhesive into a slot in said optical bench;

e2) passing an optical signal through said first collimator such that said optical signal reflects first off said input mirror, second off said temporary mirror, and then into said second collimator;

e3) monitoring said optical signal reflected into said second collimator;

e4) positioning said second collimator to maximize said reflected optical signal; and e5) curing said adhesive.

24. The method of claim 21 wherein said step f) aligning said actuator mirror includes f1) inserting an actuator having said actuator mirror and an uncured adhesive into an opening in said optical bench;

f2) passing an optical signal through said first collimator such that said optical signal reflects first off said input mirror, second off said actuator mirror, and then off said end mirror into said end collimator;

f3) monitoring said optical signal reflected into said end collimator;

f4) positioning said actuator to maximize said reflected optical signal; and f5) curing said adhesive.

* * * * *